(12) United States Patent
Kim et al.

(10) Patent No.: US 8,464,055 B2
(45) Date of Patent: Jun. 11, 2013

(54) METHOD AND APPARATUS OF ENSURING SECURITY OF COMMUNICATION IN HOME NETWORK

(75) Inventors: Hyoung-shick Kim, Suwon-si (KR); Joo-yeol Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 791 days.

(21) Appl. No.: 12/320,656

(22) Filed: Jan. 30, 2009

(65) Prior Publication Data
US 2009/0198998 A1 Aug. 6, 2009

Related U.S. Application Data

(60) Provisional application No. 61/024,967, filed on Jan. 31, 2008.

(30) Foreign Application Priority Data

Jul. 17, 2008 (KR) ........................ 10-2008-0069749

(51) Int. Cl.
*H04L 9/32* (2006.01)
*G06F 15/16* (2006.01)
*G06F 15/177* (2006.01)
*G06F 7/04* (2006.01)
*G06F 17/30* (2006.01)
*G06F 12/00* (2006.01)
*G06F 12/14* (2006.01)
*G06F 13/00* (2006.01)
*G11C 7/00* (2006.01)
*H04L 29/06* (2006.01)

(52) U.S. Cl.
USPC ........... 713/168; 709/220; 709/222; 709/228; 709/248; 726/6; 726/7; 726/21

(58) Field of Classification Search
USPC .. 709/220–222, 225, 227–229, 248; 713/168; 726/6, 7, 21
See application file for complete search history.

(56) References Cited

U.S. PATENT DOCUMENTS 6,263,437 B1 * 7/2001 Liao et al. ...................... 713/169
7,545,932 B2 * 6/2009 Durand et al. .................. 380/44

(Continued)

FOREIGN PATENT DOCUMENTS

| CN | 1479483 | 3/2004 |
|---|---|---|
| JP | 2007-36389 | 2/2007 |

(Continued)

OTHER PUBLICATIONS

Chanathip Namprempre, Secure Channels based on Authenticated Encryption Schemes: A Simple Characterization. Aug. 29, 2002. p. 1-27.*

(Continued)

*Primary Examiner* — Christian LaForgia
(74) *Attorney, Agent, or Firm* — Staas & Halsey LLP

(57) ABSTRACT

Provided are a method and apparatus to ensuring communication security between a control apparatus and a controlled apparatus in a home network. The control apparatus in the home network establishes a registration Secure Authenticated Channel (SAC) with the controlled apparatus by using a Transport Layer Security Pre-Shared Key ciphersuites (TLS-PSK) protocol implemented by using a Product Identification Number (PIN) of the controlled apparatus input from a user, shares a private key with the controlled apparatus via the registration SAC, and uses services of the controlled apparatus via a service SAC established by using the TLS-PSK protocol implemented by using the shared private key to easily implement a framework ensuring communication security in the home network.

17 Claims, 7 Drawing Sheets

U.S. PATENT DOCUMENTS

| | | | |
|---|---|---|---|
| 7,685,341 B2* | 3/2010 | Steinberg et al. | 710/72 |
| 7,739,414 B2* | 6/2010 | Yi et al. | 709/250 |
| 7,765,582 B2* | 7/2010 | Spies et al. | 726/3 |
| 7,801,870 B2* | 9/2010 | Oh et al. | 707/695 |
| 7,882,356 B2* | 2/2011 | Klemets et al. | 713/172 |
| 7,978,837 B2* | 7/2011 | Kim et al. | 379/201.02 |
| 7,979,913 B2* | 7/2011 | Jang et al. | 726/29 |
| 2003/0054810 A1* | 3/2003 | Chen et al. | 455/422 |
| 2004/0128509 A1 | 7/2004 | Gehrmann | |
| 2004/0146057 A1* | 7/2004 | Yi et al. | 370/401 |
| 2004/0210756 A1* | 10/2004 | Mowers et al. | 713/168 |
| 2005/0010801 A1* | 1/2005 | Spies et al. | 713/200 |
| 2005/0071636 A1* | 3/2005 | Lee et al. | 713/170 |
| 2005/0105735 A1* | 5/2005 | Iino et al. | 380/277 |
| 2005/0120246 A1* | 6/2005 | Jang et al. | 713/201 |
| 2005/0188193 A1* | 8/2005 | Kuehnel et al. | 713/155 |
| 2005/0240680 A1* | 10/2005 | Costa-Requena et al. | 709/250 |
| 2005/0257055 A1* | 11/2005 | Anderson | 713/170 |
| 2006/0093138 A1* | 5/2006 | Durand et al. | 380/44 |
| 2006/0112417 A1* | 5/2006 | Son et al. | 726/3 |
| 2006/0129818 A1* | 6/2006 | Kim et al. | 713/171 |
| 2006/0129837 A1* | 6/2006 | Im et al. | 713/184 |
| 2006/0155984 A1* | 7/2006 | Tsuchida et al. | 713/156 |
| 2006/0174105 A1 | 8/2006 | Park | |
| 2006/0239452 A1* | 10/2006 | Jung et al. | 380/44 |
| 2006/0248332 A1* | 11/2006 | Kim et al. | 713/155 |
| 2007/0079113 A1 | 4/2007 | Kulkarni et al. | |
| 2007/0157024 A1 | 7/2007 | Miller | |
| 2007/0234041 A1 | 10/2007 | Lakshmeshwar et al. | |
| 2008/0040282 A1* | 2/2008 | Yamamoto et al. | 705/52 |
| 2008/0095374 A1* | 4/2008 | Schreyer | 380/282 |
| 2008/0104142 A1* | 5/2008 | Oh et al. | 707/203 |
| 2008/0162935 A1* | 7/2008 | Ginzboorg et al. | 713/170 |
| 2008/0282081 A1* | 11/2008 | Patiejunas | 713/153 |
| 2009/0063863 A1* | 3/2009 | Durand et al. | 713/171 |
| 2009/0164774 A1* | 6/2009 | Sherkin | 713/155 |
| 2009/0180468 A1* | 7/2009 | Cho et al. | 370/352 |
| 2009/0182853 A1* | 7/2009 | Cho et al. | 709/222 |
| 2009/0209232 A1* | 8/2009 | Cha et al. | 455/411 |
| 2009/0210555 A1* | 8/2009 | Han et al. | 709/238 |
| 2009/0307307 A1 | 12/2009 | Igarashi | |
| 2010/0100953 A1* | 4/2010 | Mowers et al. | 726/10 |
| 2010/0325421 A1* | 12/2010 | Park et al. | 713/153 |

FOREIGN PATENT DOCUMENTS

| | | |
|---|---|---|
| JP | 2007-184737 | 7/2007 |
| JP | 2007-272868 | 10/2007 |
| KR | 10-2004-0021305 | 3/2004 |
| KR | 10-2005-0088645 | 9/2005 |
| KR | 10-2007-0062199 | 6/2007 |

OTHER PUBLICATIONS

T. Dierks & C. Allen. RFC 2246: The TLS Protocol Version 1.0. Jan. 1999. p. 1-80.*

P. Eronen & H. Tschofenig. RFC 4279: Pre-Shared Key Ciphersuites for Transport Layer Security (TLS). Dec. 2005. p. 1-16.*

International Search Report mailed Sep. 1, 2009 and issued in corresponding International Patent Application PCT/KR2009/000468.

T. Dierks et al., "The Transport Layer Security (TLS) Protocol", Version 1.1, The Internet Society Network Working Group, Apr. 2006, pp. 1-78.

Chinese Office Action mailed Dec. 4, 2012 in corresponding Chinese Patent Application No. 200980112043.6.

P. Gutmann, "Use of Shared Keys in the TLS Protocol", TLS Working Group Internet Draft, Oct. 2003, 7 pages.

* cited by examiner

METHOD AND APPARATUS OF ENSURING SECURITY OF COMMUNICATION IN HOME NETWORK

CROSS-REFERENCE TO RELATED APPLICATIONS

This application claims the benefit of U.S. Provisional Patent Application No. 61/024,967 filed on Jan. 31, 2008, in the U.S. Patent and Trademark Office, and the benefit of Korean Patent Application No. 10-2008-0069749, filed on Jul. 17, 2008, in the Korean Intellectual Property Office, the disclosures of which are incorporated herein their entirety by reference.

BACKGROUND

1. Field

The present invention relates to a home network, and more particularly, to a method and apparatus of ensuring communication security between a control apparatus and a controlled apparatus in a home network.

2. Description of the Related Art

Due to developments in home network technology, various kinds of home devices can access digital information, and users can use services provided from a home network by using the various kinds of home devices.

However, without a secure framework, digital information including a user's personal data may be exposed to a malicious attacker. In general, a public key encryption system provides confidentiality and integrity, but distribution of keys is vulnerable to the man-in-the-middle attack if there is no trusted third party.

In general, since a home network does not depend on an infrastructure controlled by a central administration but is dynamically set up, it is necessary to implement a key distribution scheme without assuming there is a trusted third party.

For example, a Control Point (CP) entering from outside of a home network should not be allowed to unrestrictedly use services provided from all home devices in the home network based on a Universal Plug and Play (UPnP) network.

SUMMARY

The present embodiments provide a method and apparatus of ensuring communication security between a control apparatus and a controlled apparatus in a home network.

Additional aspects and/or advantages will be set forth in part in the description which follows and, in part, will be apparent from the description, or may be learned by practice of the invention.

The foregoing and/or other aspects are achieved by providing a method of enabling secure communication between a control apparatus and a controlled apparatus in a home network, the method including establishing a registration Secure Authenticated Channel (SAC) with the controlled apparatus through a Transport Layer Security Pre-Shared Key ciphersuites (TLS-PSK) protocol using a Product Identification Number (PIN) that is an identifier given to the controlled apparatus at time of manufacture; establishing a private key; and sharing the private key with the controlled apparatus via the registration SAC to register the control apparatus in the controlled apparatus.

The method may further include establishing a service SAC with the controlled apparatus by using the TLS-PSK protocol implemented by using the shared private key when the controlled apparatus is discovered again after the registering is performed.

The establishing the SAC may include implementing the TLS-PSK protocol by using a TLS session resumption protocol using a value arbitrarily generated by the control apparatus as a session identifier (ID), where a ClientHello message of the TLS session resumption protocol may include information indicating that the TLS-PSK protocol to be used is implemented by using the TLS session resumption protocol.

The method may further include transmitting PINs of controlled apparatuses, in which the control apparatus is registered, to the controlled apparatus via the service SAC established using the private key, and receiving PINs stored in the controlled apparatus from the controlled apparatus to synchronize a PIN list of the control apparatus with the controlled apparatus, the operation of establishing the registration SAC by using the PIN may include determining whether the PIN of the controlled apparatus exists in the PIN list of the control apparatus when the controlled apparatus is discovered and requesting the PIN of the controlled apparatus via a user interface when it is determined that the PIN of the controlled apparatus does not exist in the PIN list.

The method may further include deleting the private key from the control apparatus according to a command input via a user interface.

The method may further include deleting at least one private key from among private keys stored in the controlled apparatus via the service SAC established using the private key, according to a command input via a user interface The foregoing and/or other aspects are achieved by providing a recording medium recorded thereon a computer program to cause a computer to execute the method.

The foregoing and/or other aspects are achieved by providing an apparatus to enable secure communication between a control apparatus and a controlled apparatus in a home network, the apparatus including a register channel establishing unit establishing a registration SAC with the controlled apparatus through a TLS-PSK protocol using a PIN that is an identifier given to the controlled apparatus at time of manufacture; and a register performing unit generating a private key and sharing the private key with the controlled apparatus via the registration SAC to register the control apparatus in the controlled apparatus.

BRIEF DESCRIPTION OF THE DRAWINGS

The above and other features and advantages will become more apparent by describing in detail embodiments thereof with reference to the attached drawings in which.

DETAILED DESCRIPTION OF EMBODIMENTS

Figure 1:
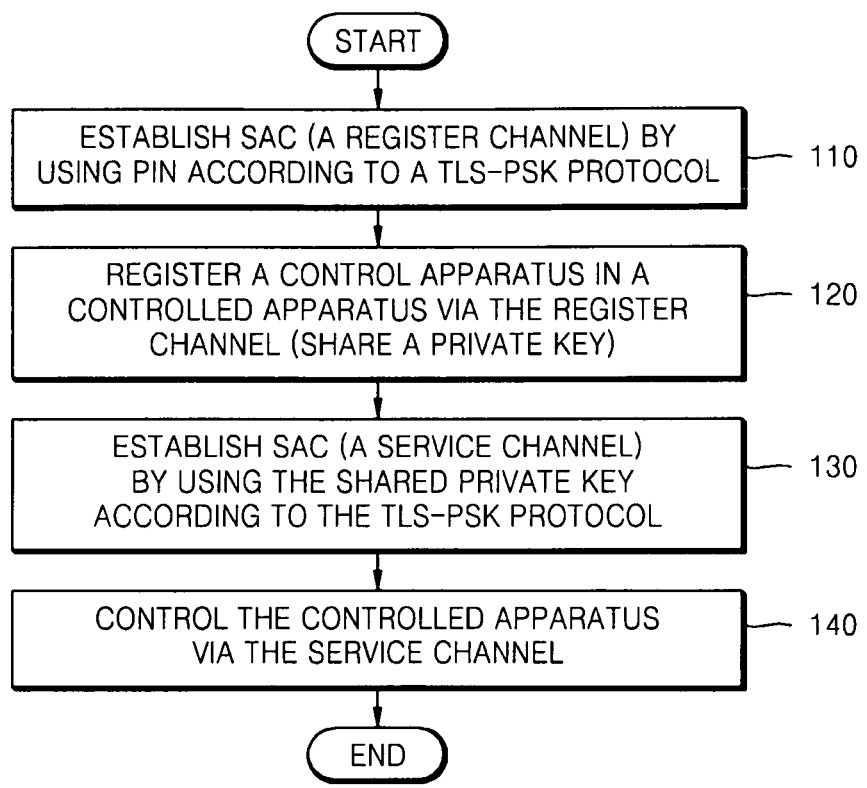
FIG. 1 is a flowchart of a procedure in which a control apparatus controls a controlled apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a flowchart of a procedure in which a control apparatus controls a controlled apparatus according to an embodiment.

According to the current embodiment, the controlled apparatus provides services only to a control apparatus registered in the controlled apparatus via a Secure Authenticated Channel (SAC) that is a safe service channel. Thus, the controlled apparatus should register authenticated control apparatuses, and this registration should also be performed via a SAC that is a safe register channel.

For example, the control apparatus may be a Control Point (CP) in a Universal Plug and Play (UPnP) network, and the controlled apparatus may be a UPnP device that may be designed to provide predetermined particular services only to a registered CP via a SAC. Also, in order to implement the embodiments, new actions may be defined in the UPnP device.

In operation 110, the control apparatus establishes a SAC by using a Product Identification Number (PIN) according to a Transport Layer Security Pre-Shared Key ciphersuites (TLS-PSK) protocol, for example. The PIN may indicate an identifier given to the controlled apparatus at the time of manufacture. Such a PIN may be internally or externally recorded in the controlled apparatus, or may be separately provided to a user purchasing the controlled apparatus.

TLS is a protocol used in Internet communication security. The TLS-PSK protocol is designed to implement TLS by using a pre-shared symmetric key, instead of using a public key certificate, and to avoid a complicated calculation necessary for an authentication procedure using a public key. The SAC may be established by the control apparatus and the controlled apparatus according to the TLS-PSK protocol. The TLS and the TLS-PSK protocol are respectively defined in Request for Comments (RFC) 4346 and RFC 4279, and thus, detailed descriptions thereof will be omitted here.

In operation 120, the control apparatus registers the control apparatus itself in the controlled apparatus via the established SAC that is the safe register channel. The fact that the control apparatus is registered in the controlled apparatus means that the control apparatus transmits a private key generated by the control apparatus itself to the controlled apparatus via the SAC. That is, when a registration procedure is ended, the control apparatus and the controlled apparatus share the same private key.

In operation 130, the control apparatus and the controlled apparatus establish a SAC by using the TLS-PSK protocol implemented by using the shared private key. The SAC established in operation 110 is a register channel used to register the control apparatus in the controlled apparatus, and the SAC established in operation 130 is a service channel used to provide services of the controlled apparatus to the control apparatus that is registered in the controlled apparatus in order to control the controlled apparatus.

In operation 140, the control device controls the controlled apparatus via the SAC established in operation 130.

Figure 2:
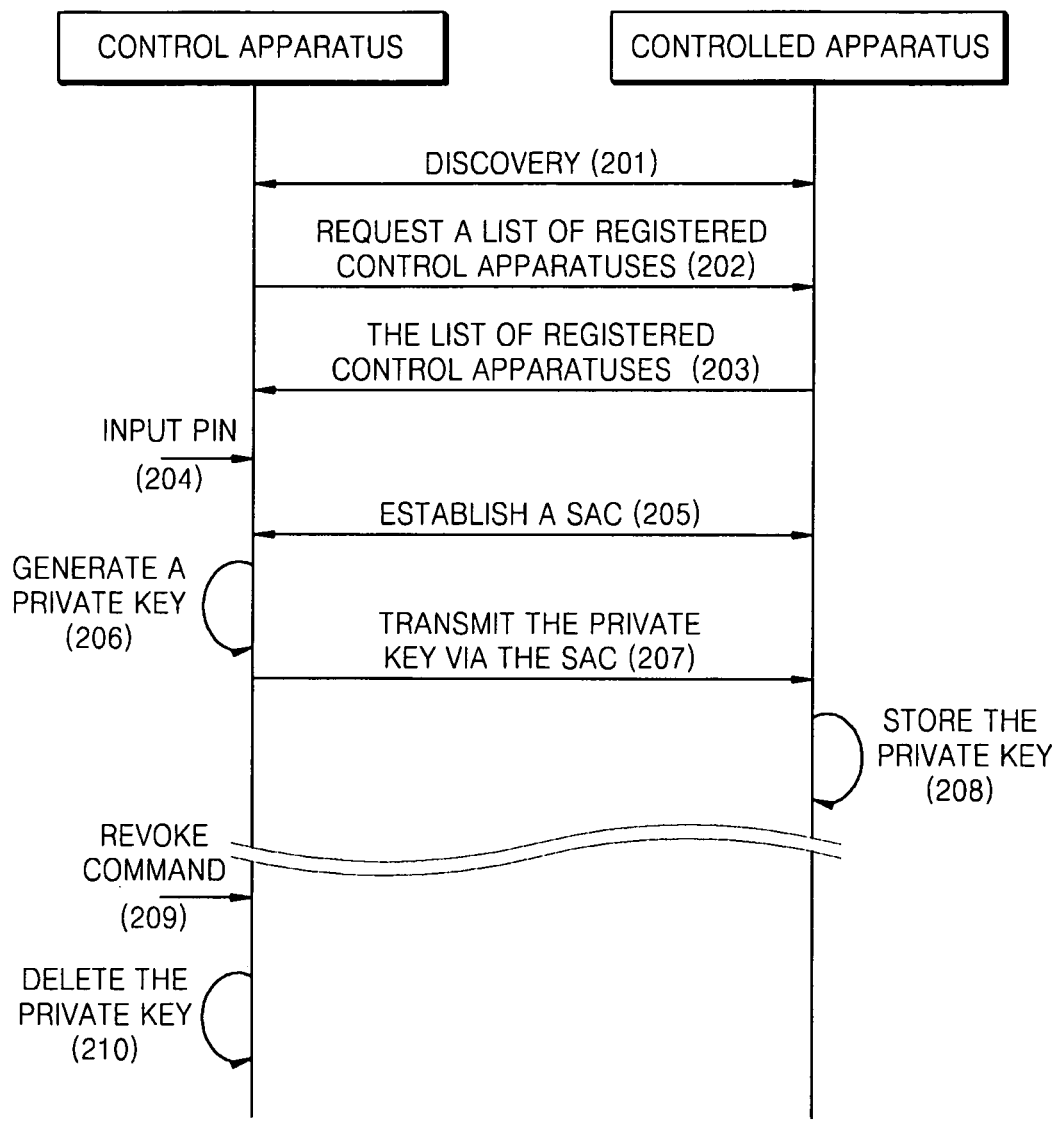
FIG. 2 is a flowchart of a method of registering a control apparatus in a controlled apparatus according to another embodiment.

FIG. 2 is a flowchart of a method of registering a control apparatus in a controlled apparatus according to another embodiment. That is, in the current embodiment, it is assumed that the control apparatus is not yet registered in the controlled apparatus.

In operation 201, the control apparatus discovers the controlled apparatus. For example, operation 201 corresponds to a discovery according to a Simple Service Discovery Protocol (SSDP) in a UPnP network.

In operation 202, the control apparatus requests the controlled apparatus for a list of registered control apparatuses. For this request, a new action may be defined in a UPnP device.

In operation 203, the controlled apparatus transmits the list of registered control apparatuses to the control apparatus. In the current embodiment, it is assumed that the control apparatus is not yet registered in the controlled apparatus, and thus the control apparatus requests a user for a PIN of the controlled apparatus via a user interface.

In operation 204, the control apparatus receives the PIN of the controlled apparatus from the user via the user interface. Thus, the PIN is shared between the control apparatus and the controlled apparatus.

In operation 205, the control apparatus and the controlled apparatus establish a SAC by using the TLS-PSK protocol implemented by using the shared PIN. The established SAC is a registration channel used to register the control apparatus in the controlled apparatus.

In operation 206, the control apparatus arbitrarily generates a private key.

In operation 207, the control apparatus transmits the private key to the controlled apparatus via the SAC.

In operation 208, the controlled apparatus stores the private key. By doing so, the private key is shared between the control apparatus and the controlled apparatus and is used at a later time to establish a service channel by using the TLS-PSK protocol.

Meanwhile, a user may attempt to forbid the control apparatus to control a user selected controlled apparatus. In this regard, a procedure to revoke the user selected controlled apparatus will now be described in operations 209 and 210.

In operation 209, the user inputs a revoke command about the user selected controlled apparatus via the user interface of the control apparatus. In order to enable the user to identify controlled apparatuses, friendly names or model numbers of the controlled apparatuses may be displayed on the user interface.

In operation 210, the control apparatus deletes information including a device ID, a private key, etc. about the user selected controlled apparatus.

Figure 3:
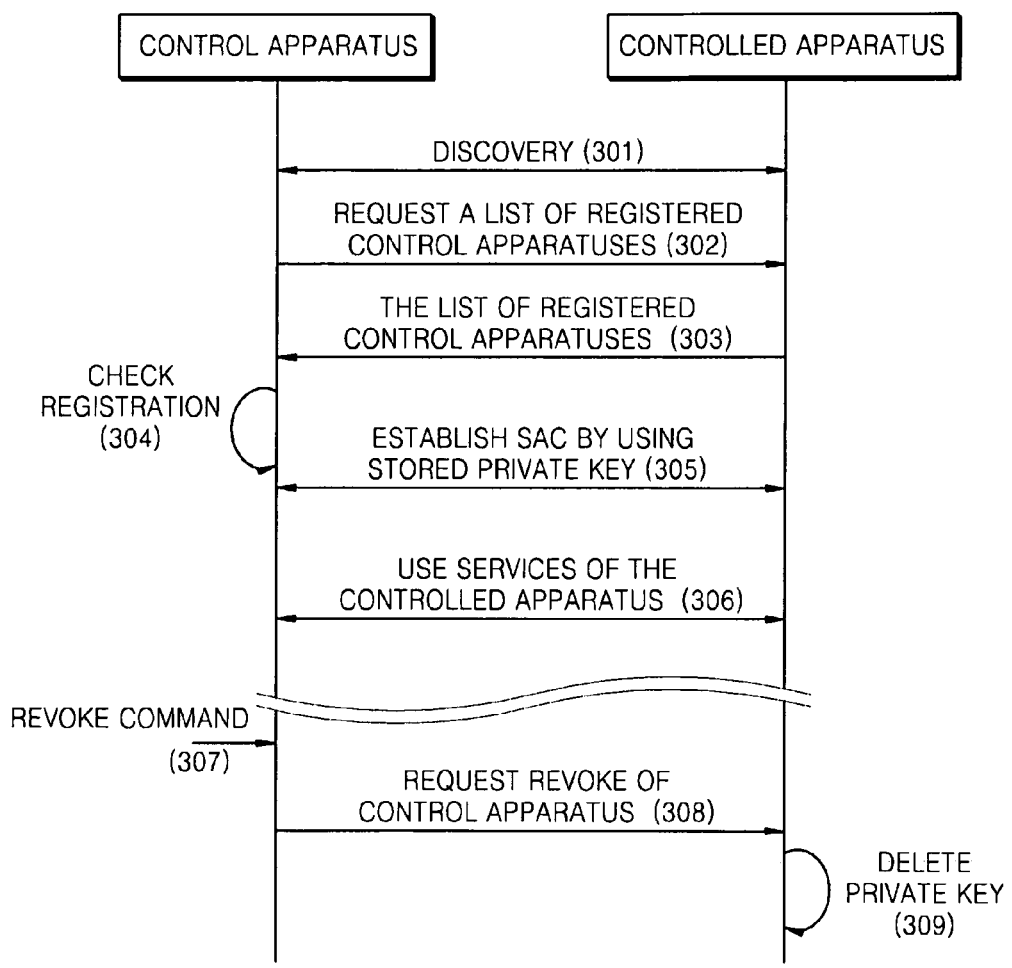
FIG. 3 is a flowchart of a method of controlling a controlled apparatus by a control apparatus registered in the controlled apparatus according to another embodiment.

FIG. 3 is a flowchart of a method of controlling a controlled apparatus by a control apparatus registered in the controlled apparatus according to another embodiment. In the current embodiment, it is assumed that the control apparatus is already registered in the controlled apparatus.

In operation 301, the control apparatus discovers the controlled apparatus.

In operation 302, the control apparatus requests the controlled apparatus for a list of registered control apparatuses.

In operation 303, the controlled apparatus transmits the list of registered control apparatuses to the control apparatus.

In operation 304, the control apparatus refers to the list of registered control apparatuses, thereby checking that the control apparatus itself is registered in the list of registered control apparatuses. In order to show the registered control apparatuses, device IDs of the registered control apparatuses may be used in the list of registered control apparatuses. For the device ID, any unique value capable of being used to identify a device may be used. For example, a Media Access Control (MAC) address of the registered control apparatuses may be used.

In operation 305, the control apparatus and the controlled apparatus establish a SAC by using the TLS-PSK protocol implemented by using a stored private key. The fact that the control apparatus is registered in the controlled apparatus means that the control apparatus and the controlled apparatus already share the private key.

In operation 306, the control apparatus uses services of the controlled apparatus via the SAC established in operation 305.

Meanwhile, a user may revoke a user selected control apparatus from among the control apparatuses registered in the controlled apparatus. This revoke procedure will now be described in relation to operations 307 through 309.

In operation 307, the user inputs a revoke command with respect to the user selected control apparatus from among the control apparatuses registered in the controlled apparatus via a user interface of the control apparatus. In order to enable the user to identify the registered control apparatuses, friendly names or model numbers of the registered control apparatuses may be displayed on the user interface.

In operation 308, the control apparatus requests the controlled apparatus to revoke the user selected control apparatus via the SAC established in operation 305. Such a revocation service may be included in the services provided by the controlled apparatus, and may be defined as a new action in UPnP. Thus, the revoke request from the control apparatus may be realized only via a service channel.

In operation 309, the controlled apparatus deletes information, including an ID of the user selected control apparatus, a private key shared between the controlled apparatus and the user selected control apparatus, etc., about the user selected control apparatus. Thus, the user selected control apparatus does not share the private key with the controlled apparatus any more, and the user selected control apparatus cannot establish a service channel with the controlled apparatus and cannot use the services of the controlled apparatus.

Figure 4:
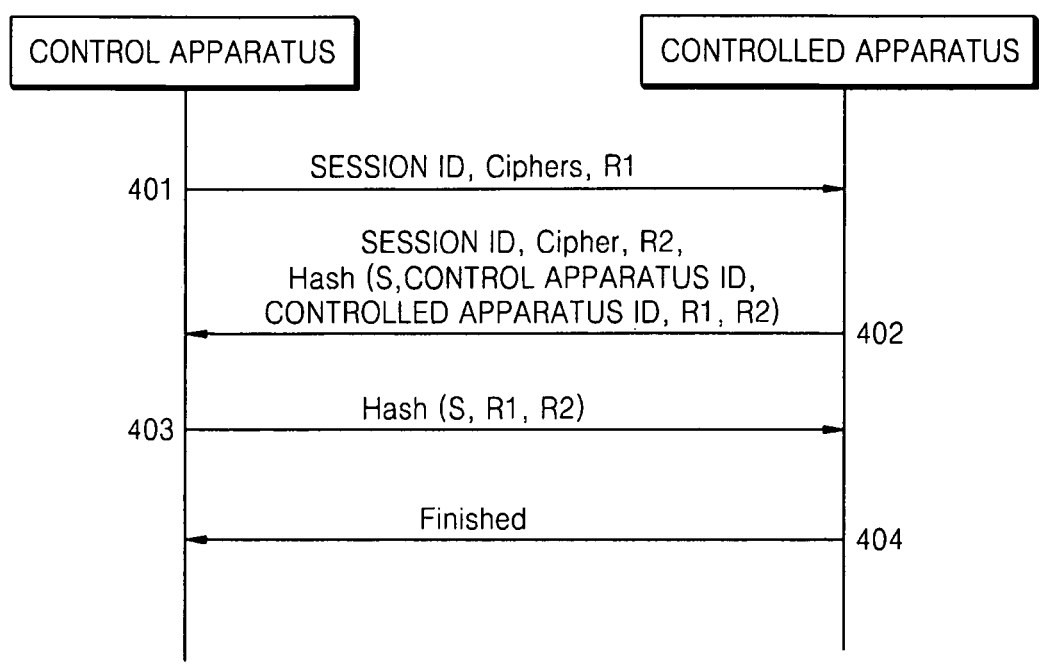
FIG. 4 is a flowchart of a method of implementing a Transport Layer Security Pre-Shared Key ciphersuites (TLS-PSK) protocol by using a TLS session resumption protocol according to another embodiment.

FIG. 4 is a flowchart of a method of implementing the TLS-PKS protocol by using a TLS session resumption protocol according to another embodiment of the present invention.

TLS-PKS may be implemented according to RFC 4279. However, currently, most devices implementing TLS 1.1 do not support the RFC 4279. Thus, it is necessary to implement the TLS-PKS in the devices not supporting RFC 4279 to minimize a change in a protocol stack of the existing devices using the TLS protocol. In the current embodiment, the method of implementing the TLS-PKS by using the TLS session resumption protocol will now be described.

When a server and a client complete authentication via TLS, a session is ended. After that, when the session resumes, a session resumption protocol is used to omit an authentication procedure by using a session ID so as not to repeat the performing of public key calculations (e.g., a Rivest-Shamir-Adleman (RSA) algorithm).

In operation 401, a control apparatus transmits a session ID, ciphers, and a random number R1 to a controlled apparatus. At this time, the control apparatus arbitrarily selects the session ID. For example, an ID of the control apparatus and/or an ID of the controlled apparatus may be used as the session ID.

Such information is included in a ClientHello message, for example, of the session resumption protocol, and then is transmitted to the controlled apparatus. Thus, the ClientHello message may include information indicating that the TLS-PSK protocol to be used is implemented by using the TLS session resumption protocol. For example, the information may be included in the ciphers (cipher suites) or the session ID.

In operation 402, according to the information included in the ClientHello message, the controlled apparatus recognizes that the control apparatus requests the TLS-PSK protocol implemented by using the TLS session resumption protocol. Thus, the controlled apparatus does not determine the validity of the session ID but transmits a session ID equal to the received session ID, a cipher, a random number R2, and Hash values (S, control apparatus ID, controlled apparatus ID, R1, and R2) to the control apparatus. Here, S indicates a value used as PreMasterSecret in the TLS session resumption protocol, and in the current embodiment, a PIN of the controlled apparatus input by a user is allocated to the S value. In operation 402, according to the received Hash values, the control apparatus may recognize that the controlled apparatus has the PreMasterSecret S.

In operation 403, the control apparatus calculates Hash values (S, R1, and R2) to inform the controlled apparatus that the control apparatus itself also has the PreMasterSecret S, and then transmits a result of the calculation to the controlled apparatus.

In operation 404, the controlled apparatus transmits a Finished message to the control apparatus to inform the control apparatus that use of the protocol has successfully ended.

Figure 5:
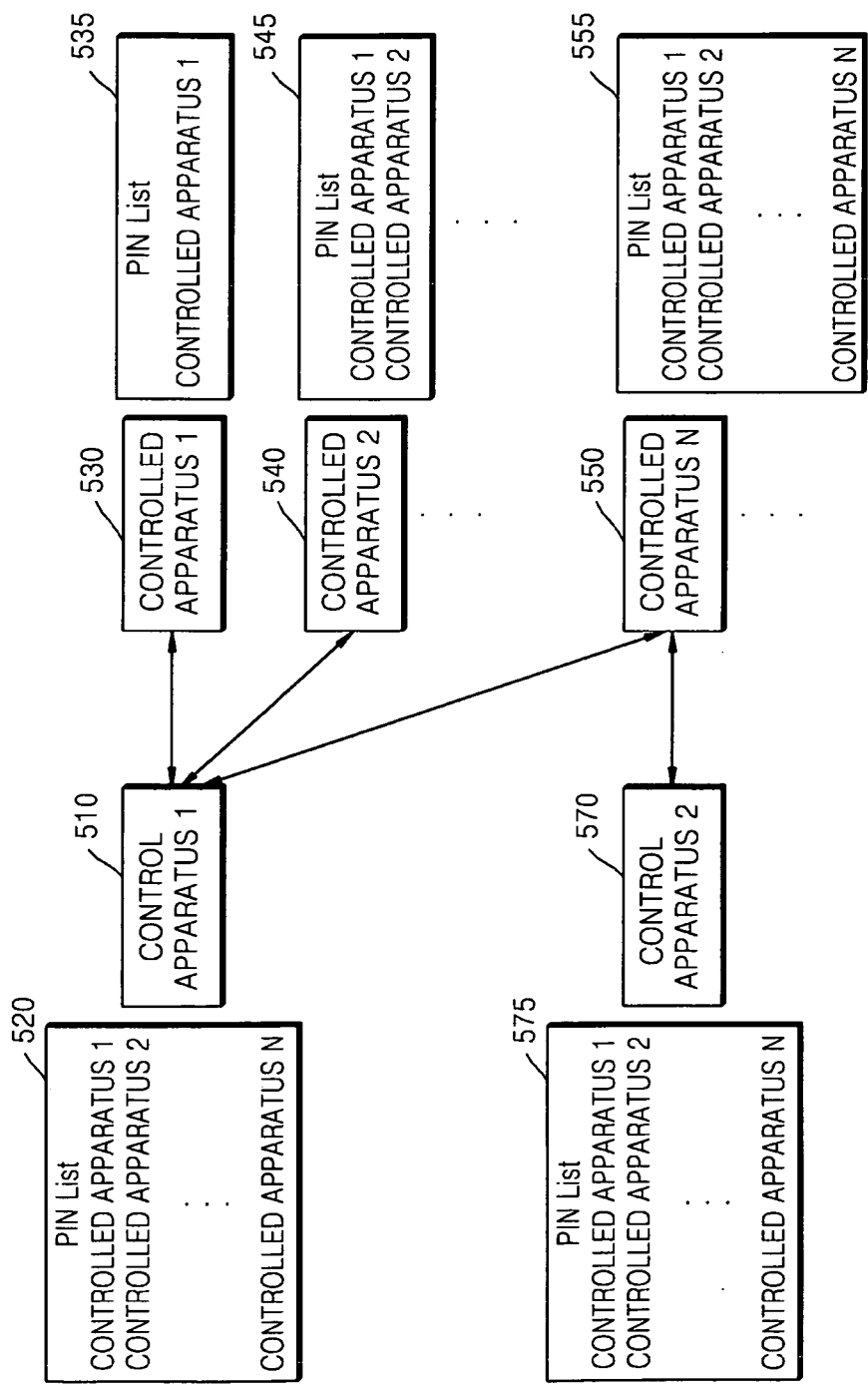
FIG. 5 is a block diagram for describing a method of managing Product Identification Numbers (PINs) according to another embodiment.

FIG. 5 is a block diagram to describe a method of managing PINs according to another embodiment.

According to the embodiments, whenever the control apparatus or the controlled apparatus is changed in the home network, a user has to detect a PIN of the controlled apparatus to perform a registration procedure and to input the PIN via the user interface of the control apparatus. The current embodiment is presented to reduce such an inconvenience.

In the current embodiment, all control apparatuses and controlled apparatuses manage PIN lists. Whenever a control apparatus is registered in a controlled apparatus, both PIN lists are synchronized. Each PIN list may include information displayed in the form of a table in which IDs and PINs of the controlled apparatuses are mapped. This will now be described in detail with reference to FIG. 5.

A user first registers a control apparatus 1 510 in a controlled apparatus 1 530. That is, a PIN of the controlled apparatus 1 530 is recorded in a PIN list 520 of the control apparatus 1 510. At this time, the controlled apparatus 1 530 also records its own PIN in a PIN list 535.

Next, the user registers the control apparatus 1 510 in a controlled apparatus 2 540. Accordingly, a PIN of the controlled apparatus 2 540 is added to the PIN list 520 of the control apparatus 1 510. At this time, the control apparatus 1 510 synchronizes the PIN list 520 with a PIN list 545 of the controlled apparatus 2 540. Accordingly, the PIN of the controlled apparatus 1 530 and the PIN of the controlled apparatus 2 540 are recorded in the PIN list 545 of the controlled apparatus 2 540.

In this manner, when the control apparatus 1 510 is registered in all of the controlled apparatus 1 530, the controlled apparatus 2 540, through to a controlled apparatus N 550, as illustrated in FIG. 5, the PIN list 520 of the control apparatus 1 510 and a PIN list 555 of the controlled apparatus N 550 have all the PINs of the N controlled apparatuses.

After that, the user connects to a home network by using a control apparatus 2 570 that is a new control apparatus. In order to register the control apparatus 2 570 in the controlled apparatus N 550, the user inputs the PIN of the controlled apparatus N 550 via a user interface of the control apparatus 2 570.

When the control apparatus 2 570 is registered in the controlled apparatus N 550, the control apparatus 2 570 and the controlled apparatus N 550 synchronize their PIN lists. Since all of the PINs of the N controlled apparatuses are already recorded in the PIN list 555 of the controlled apparatus N 550, all of the PINs of the N controlled apparatuses are also recorded in a PIN list 575 of the control apparatus 2 570.

After that, when the user registers the control apparatus 2 570 in another controlled apparatus such as the controlled apparatus 1 530, the user does not have to input the PIN of the controlled apparatus 1 530 in the control apparatus 2 570. This is because the PIN of the controlled apparatus 1 530 is already recorded in the PIN list 575 of the control apparatus 2 570.

Figure 6:
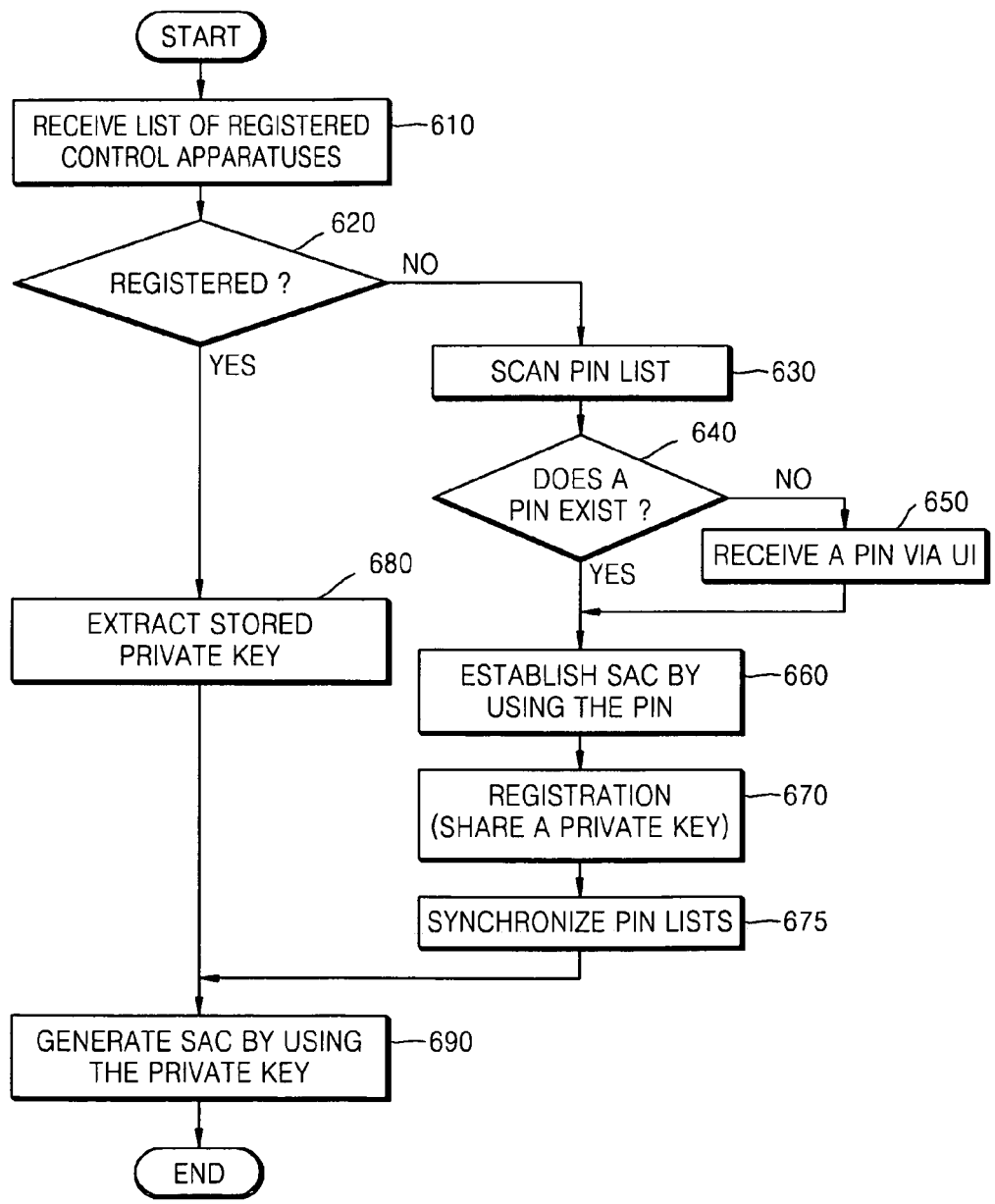
FIG. 6 is a flowchart of an operation procedure of a control apparatus to manage PINs according to another embodiment.

FIG. 6 is a flowchart of an operation procedure of a control apparatus to manage PINs according to another embodiment.

In operation 610, the control apparatus receives a list of registered control apparatuses from a controlled apparatus.

In operation 620, the control apparatus checks whether a device ID of the control apparatus itself is included in device IDs recorded in the list, thereby determining whether the control apparatus itself is registered in the controlled apparatus. If registered, the operation procedure proceeds to operation 680. However, if not registered, the operation procedure proceeds to operation 630.

In operation 680, the control apparatus extracts a stored private key. This is because the fact that the control apparatus is registered in the controlled apparatus means that the control apparatus and the controlled apparatus already share a private key.

In operation 690, the control apparatus and the controlled apparatus establish a SAC by using the TLS-PSK protocol implemented by using the private key. The established SAC is a service channel used to use services of the controlled apparatus.

In operations 630 and 640, the control apparatus scans a PIN list to detect a PIN of the controlled apparatus. If the PIN of the controlled apparatus exists in the PIN list of the control apparatus, the operation procedure proceeds to operation 660, but if the PIN of the controlled apparatus does not exist, the operation procedure proceeds to operation 650.

In operation 650, the control apparatus receives the PIN of the controlled apparatus from a user via a user interface.

In operation 660, the control apparatus and the controlled apparatus establish a SAC by using the TLS-PSK protocol implemented by using the shared PIN. The established SAC is used to register the control apparatus in the controlled apparatus.

In operation 670, the control apparatus transmits a private key to the controlled apparatus via the SAC established in operation 660, thereby performing a registration procedure. As described above, the control apparatus may arbitrarily generate the private key.

In operation 675, the control apparatus and the controlled apparatus synchronize their PIN lists via the SAC established in operation 660. Thus, the control apparatus and the controlled apparatus have the same PIN list. Operation 690 has already been described above.

Figure 7:
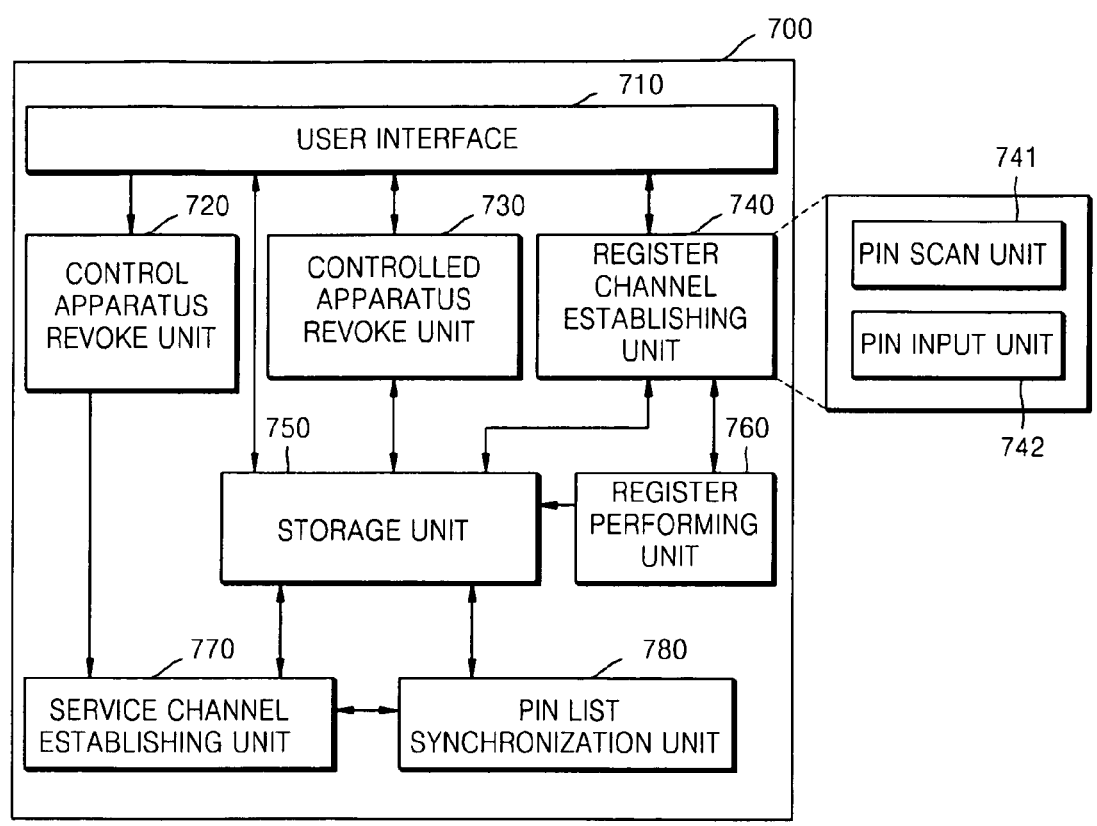
FIG. 7 is a block diagram of a structure of a control apparatus, according to an embodiment.

FIG. 7 is a block diagram of a structure of a control apparatus 700, according to an embodiment of the present invention.

As illustrated in FIG. 7, the control apparatus 700 according to the current embodiment includes a user interface 710, a control apparatus revoke unit 720, a controlled apparatus revoke unit 730, a register channel establishing unit 740, a storage unit 750, a register performing unit 760, a service channel establishing unit 770, and a PIN list synchronization unit 780. The register channel establishing unit 740 includes a PIN scan unit 741 and a PIN input unit 742.

The user interface 710 receives a control apparatus revoke command, a controlled apparatus revoke command, a PIN of the control apparatus 700, etc., from a user, and displays various kinds of information that the user is to be informed about.

The register channel establishing unit 740 establishes a SAC with a controlled apparatus (not shown) by using the TLS-PSK protocol implemented by using a PIN of the controlled apparatus input from the user. The register channel establishing unit 740 uses an arbitrarily selected value as a session ID in a TLS session resumption protocol to implement the TLS-PSK protocol by using the TLS session resumption protocol. At this time, a ClientHello message may include information indicating that the TLS-PSK protocol is implemented by using the TLS session resumption protocol.

When the controlled apparatus is discovered, the PIN scan unit 741 scans a PIN list stored in the storage unit 750 to check whether the PIN of the control apparatus 700 exists in the PIN list. If the PIN of the control apparatus 700 does not exist in the PIN list, the PIN input unit 742 receives the PIN from the user via the user interface 710.

The register performing unit 760 generates and stores a private key in the storage unit 750, and safely transmits the generated private key to the controlled apparatus via the SAC established by the register channel establishing unit 740, thereby registering the control apparatus 700 in the controlled apparatus.

The service channel establishing unit 770 establishes a SAC with the controlled apparatus by using the TLS-PSK protocol implemented by using the private key shared between the control apparatus 700 and the controlled apparatus.

When the registration of the control apparatus 700 is completed, the PIN list synchronization unit 780 synchronizes the PIN list with the controlled apparatus, and stores the PIN list in the storage unit 750.

When a user inputs a revoke command about a specific controlled apparatus via the user interface 710, the control apparatus revoke unit 720 deletes information including a device ID, a shared private key, etc., about the specific controlled apparatus from the storage unit 750.

When a user inputs a revoke command about a specific control apparatus registered in the controlled apparatus via the user interface 710, the controlled apparatus revoke unit 730 requests the controlled apparatus to revoke the specific control apparatus via the SAC established by the service channel establishing unit 770. Upon receipt of such a request, the controlled apparatus deletes information, including a device ID, a private key shared between the controlled apparatus and the specific control apparatus, etc., about the specific control apparatus.

According to the present embodiments, it is possible to easily implement a framework ensuring communication security in a home network.

The embodiments can be written as computer programs and can be implemented in general-use digital computers that execute the programs by using a computer readable medium.

Examples of the computer readable medium include computer readable recording media such as magnetic storage media (e.g., ROM, floppy disks, hard disks, etc.) and optical recording media (e.g., CD-ROMs, or DVDs), and media such as carrier waves (e.g., transmission through the Internet).

While this invention has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of enabling secure communication between a control apparatus and a controlled apparatus in a home network, the method comprising:
    receiving an identifier of the controlled apparatus through a user interface of the control apparatus;
    performing an authentication with the controlled apparatus by establishing, by a processor, a registration Secure Authenticated Channel (SAC) with the controlled apparatus through a protocol using the identifier of the controlled apparatus;
    generating a private key;
    sharing the private key with the controlled apparatus via the registration SAC to register the control apparatus in the controlled apparatus;
    recording the identifier of the controlled apparatus in an identifier list of the control apparatus; and
    synchronizing the identifier list of the control apparatus with the controlled apparatus via the registration SAC.

2. The method according to claim 1, wherein the protocol is a Transport Layer Security Pre-Shared Key ciphersuites (TLS-PSK) protocol.

3. The method according to claim 2, wherein the identifier is a Product Identification Number (PIN).

4. The method of claim 3, further comprising establishing a service SAC with the controlled apparatus by using the TLS-PSK protocol implemented by using the shared private key when the controlled apparatus is discovered again after the registering is performed.

5. The method of claim 2, wherein the establishing of the SAC includes implementing the TLS-PSK protocol by using a TLS session resumption protocol using a value arbitrarily generated by the control apparatus as a session identifier, a ClientHello message of the TLS session resumption protocol including information indicating that the TLS-PSK protocol to be used is implemented by using the TLS session resumption protocol.

6. The method of claim 4, wherein synchronizing the PIN list further comprises transmitting PINs of controlled apparatuses, in which the control apparatus is registered, to the controlled apparatus via the registration SAC established using the private key, and receiving PINs stored in the controlled apparatus from the controlled apparatus,
    wherein the establishing of the registration SAC by using the PIN includes determining whether the PIN of the controlled apparatus exists in the PIN list of the control apparatus when the controlled apparatus is discovered and as a result of the determining, when the PIN of the controlled apparatus does not exist in the PIN list, requesting the PIN of the controlled apparatus via a user interface when the PIN of the controlled apparatus is determined to not exist in the PIN list of the control apparatus.

7. The method of claim 1, further comprising deleting the private key from the control apparatus according to a command input via a user interface.

8. The method of claim 4, further comprising deleting at least one private key from among private keys stored in the controlled apparatus via the service SAC established using the private key, according to a command input via a user interface.

9. The method of claim 1, wherein the identifier of the controlled apparatus is given at the time of manufacture.

10. A non-transitory computer-readable recording medium having recorded thereon a computer program to cause a computer to execute the method of claim 1.

11. An apparatus enabling secure communication between a control apparatus and a controlled apparatus in a home network, the apparatus comprising:
    a processor comprising:
        a user interface unit receiving a Product Identification Number (PIN) that is an identifier given to the controlled apparatus at the time of manufacture;
        a register channel establishing unit performing an authentication with the controlled apparatus by establishing a registration Secure Authenticated Channel (SAC) with the controlled apparatus through a TLS-PSK protocol using the PIN;
        a register performing unit generating a private key, sharing the private key with the controlled apparatus via the registration SAC to registering the control apparatus in the controlled apparatus; and
        a PIN list synchronization unit recording the PIN in a PIN list of the control apparatus and synchronizing the PIN list of the control apparatus with the controlled apparatus via the registration SAC.

12. The apparatus of claim 11, further comprising a service channel establishing unit establishing a service SAC with the controlled apparatus through the TLS-PSK protocol using the private key when the controlled apparatus is discovered again after the registering is performed.

13. The apparatus of claim 11, wherein the register channel establishing unit implements the TLS-PSK protocol by using a TLS session resumption protocol using a value arbitrarily generated by the control apparatus as a session identifier (ID), a ClientHello message of the TLS session resumption protocol including information indicating that the TLS-PSK protocol to be used is implemented by using the TLS session resumption protocol.

14. The apparatus of claim 13, wherein an identifier of the control apparatus and/or the identifier of the controlled apparatus is used as the session ID.

15. The apparatus of claim 12, wherein the PIN list synchronization unit further comprises:
    transmitting PINs of controlled apparatuses, in which the control apparatus is registered, to the controlled apparatus via the service SAC established using the private key, and receiving PINs stored in the controlled apparatus from the controlled apparatus
    wherein the register channel establishing unit includes a PIN scan unit determining whether the PIN of the controlled apparatus exists in the PIN list of the control apparatus when the controlled apparatus is discovered and a PIN input unit requesting the PIN of the controlled apparatus via a user interface when the PIN of the controlled apparatus is determined to not exist in the PIN list of the control apparatus.

16. The apparatus of claim 11, further comprising a controlled apparatus revoke unit deleting the private key from the control apparatus according to a command input via a user interface.

17. The apparatus of claim 11, further comprising a control apparatus revoke unit deleting at least one private key from among private keys stored in the controlled apparatus via the service SAC established using the private key, according to a command input via a user interface.

* * * * *

UNITED STATES PATENT AND TRADEMARK OFFICE
CERTIFICATE OF CORRECTION

PATENT NO. : 8,464,055 B2
APPLICATION NO. : 12/320656
DATED : June 11, 2013
INVENTOR(S) : Hyoung-shick Kim et al.

It is certified that error appears in the above-identified patent and that said Letters Patent is hereby corrected as shown below:

In the Specification:

In Col. 1, Line 13 (Approx.), After "herein" insert --in--.

Signed and Sealed this
Eighth Day of October, 2013

Teresa Stanek Rea
*Deputy Director of the United States Patent and Trademark Office*